United States Patent [19]

Giustiniani et al.

[11] 4,330,781
[45] May 18, 1982

[54] RADAR INDICATORS WITH DIGITAL PROCESSING OF VIDEO SIGNAL

[75] Inventors: Piercarlo Giustiniani; Franco Vincentini, both of Rome, Italy

[73] Assignee: Selenia Industrie Elettroniche Associate S.p.A., Italy

[21] Appl. No.: 62,076

[22] Filed: Jul. 30, 1979

[51] Int. Cl.³ .............................................. G01S 7/06
[52] U.S. Cl. .................................................. 343/5 DP
[58] Field of Search ..................................... 343/5 DP

[56] References Cited

U.S. PATENT DOCUMENTS

| | | | |
|---|---|---|---|
| 3,653,042 | 3/1972 | Molho | 343/5 DP |
| 3,683,373 | 8/1972 | Barnes et al. | 343/5 DP |
| 4,068,233 | 1/1978 | Pease et al. | 343/5 DP X |
| 4,107,673 | 8/1978 | Gross et al. | 343/5 DP |
| 4,206,461 | 6/1980 | Pease et al. | 343/5 DP |
| 4,208,657 | 6/1980 | Bryden et al. | 343/5 DP |

FOREIGN PATENT DOCUMENTS 1310343 3/1973 United Kingdom .

OTHER PUBLICATIONS

Safety at Sea, Sep. 1978, "Multiscan for More Information", pp. 45,46.

*Primary Examiner*—Malcolm F. Hubler
*Attorney, Agent, or Firm*—Beveridge, DeGrandi & Kline

[57] ABSTRACT

The invention relates to an improvement in radar indicators with digital processing of the signal wherein the raw video signal is firstly digitized and stored in temporary memories for subsequent readout at a rate lower than the writing rate, and for some ranges the readout is repeated for more than one time; further for long ranges it includes a pulse stretcher for increasing the brightness of faraway targets; and finally an anti-interference digital processing including a non-linear transfer function of the digitized video signal which is then converted back into analogue video signal for display.

6 Claims, 9 Drawing Figures

TIMING WAVEFORMS OF VIDEO CHAIN

FIG. 5

OUTPUT VIDEO LEVEL VS. INPUT VIDEO LEVEL AS A FUNTION OF MULTISCAN SWITCH POSITION AND RANGE SWITCH SETTING.

RADAR INDICATORS WITH DIGITAL PROCESSING OF VIDEO SIGNAL

The present invention relates to an improvement in radar indicators with digital processing of the signal. Radar indicators are known which perform a digital processing of the raw video signal applied on the input for obtaining an improvement of the display and for rendering easier the task of the operator.

The purpose of this invention is the one of providing a radar indicator of the abovesaid kind which allows to obtain with respect to the known art a greater brightness of the display, particularly on the short ranges, together with a greater simplicity of the deflection circuits of the cathode ray tube of the indicator.

With the conventional techniques the received video signal is sent directly to modulate the electron beam of the cathode ray tube. The electron beam of the cathode ray tube is deflected with a speed depending from the selected full scale and which increases with the decreasing of the full scale or range.

As a consequence of this the elemental permanence time of the beam on a spot to be illuminated of the screen of the radar display decreases with the decreasing of the full scale and proportionally the brightness of the display decreases. Moreover with the change of the full scale it is necessary to change the value of the driving current of the deflection coils of the electron beam with consequent circuit complications and a greater dissipation of power.

In order to obtain a high brightness substantially constant with the changes of the selected full scale on the radar apparatus, it is foreseen according to the present invention the following:

to memorize in a full phase the portion of the radar sweep which has to be displayed.

to display one or more times in the residual time of the repetition period at a writing rate corresponding to a full scale possibly constant and independent from the selected range.

Other features according to the present invention are the following:

quantization on eight levels (three bits) in order to obtain an appearance of the display as much as possible similar to the analog one;

possibility of eliminating the radar interferences caused by other radar apparatus with a particular anti-interference circuit;

improvement of the brightness of the display on the long scales obtained by means of the stretching of the video pulses the amplitude of which is greater than a predetermined threshold;

possibility of modifying the input-output transfer function in order to obtain an optimized display with the change of the ambient situation.

The present invention will be now disclosed with reference to a preferred embodiment referred to as an example and according to the figures of the attached drawings, wherein.

The first section comprises the video chain and includes:

a analog/digital converter;

a memory utilized for memorizing the samples of a sweep with the associated writing and reading circuits;

a memory and an anti-interference logic;

a logic for the modification of the transfer function and for the stretching of the pulses;

a digital to analog converter and the video output circuits.

The second section for the timing and control includes:

a local oscillator synchronized with the radar trigger;

circuits for the generation of the sequence of the writing and reading phases according to the pulse repetition frequency which is being used;

circuits for the generation and selection of the sampling frequences to be used for writing and reading according to the selected full scale;

a counter utilized for addressing the memories of the video chain and for determining the duration of the writing and reading phases according to the selected full scale;

a circuit for the distribution of the information concerning the full scale and operative base;

a circuit for the generation and alignment of the readout trigger.

Figure 1:
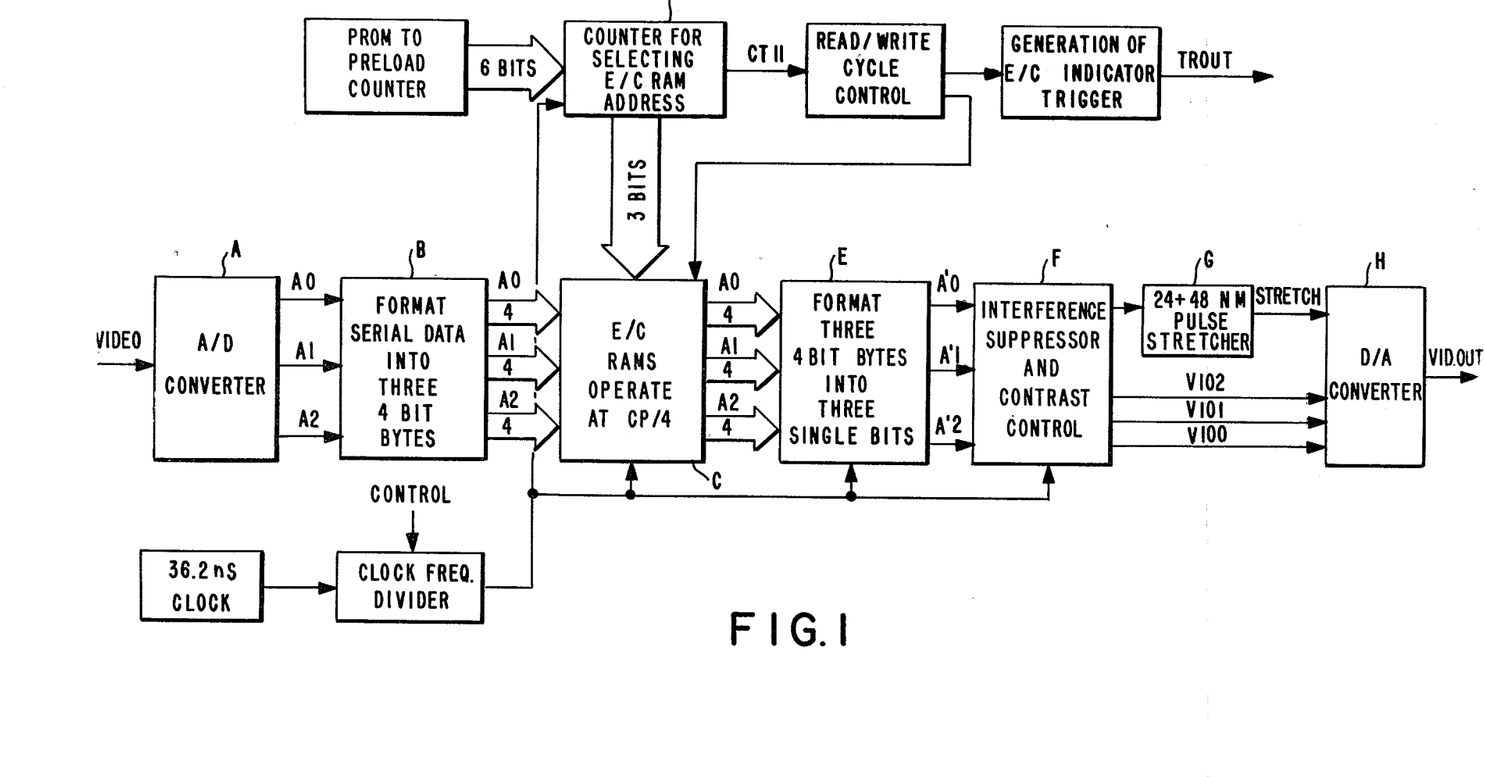
FIG. 1 shows the simplified block diagram of the processing system according to the present invention.

With reference to FIG. 1, in this figure there is shown the general block diagram of the system according to the invention.

As it may be noted from this figure, the input video signal is brought to an analog-digital converter A which provides on its output three bits A0, A1, A2 corresponding to eight levels of the input signal. These three bits are brought to a former B which converts these data into Bytes each of which comprises four bits which are brought to the bank of memories C controlled by means of the address counter D. The output of the memories contained in the block C is brought to a reshaper of the signal into three bits A'0, A'1, A'2 which are brought to a circuit F for the contrast control and interference suppression. The outputs of the block F are brought to a pulse stretcher for the longer radar ranges shown in G and to a digital-analog converter H wherefrom the processes video signal is taken out.

Figure 2:
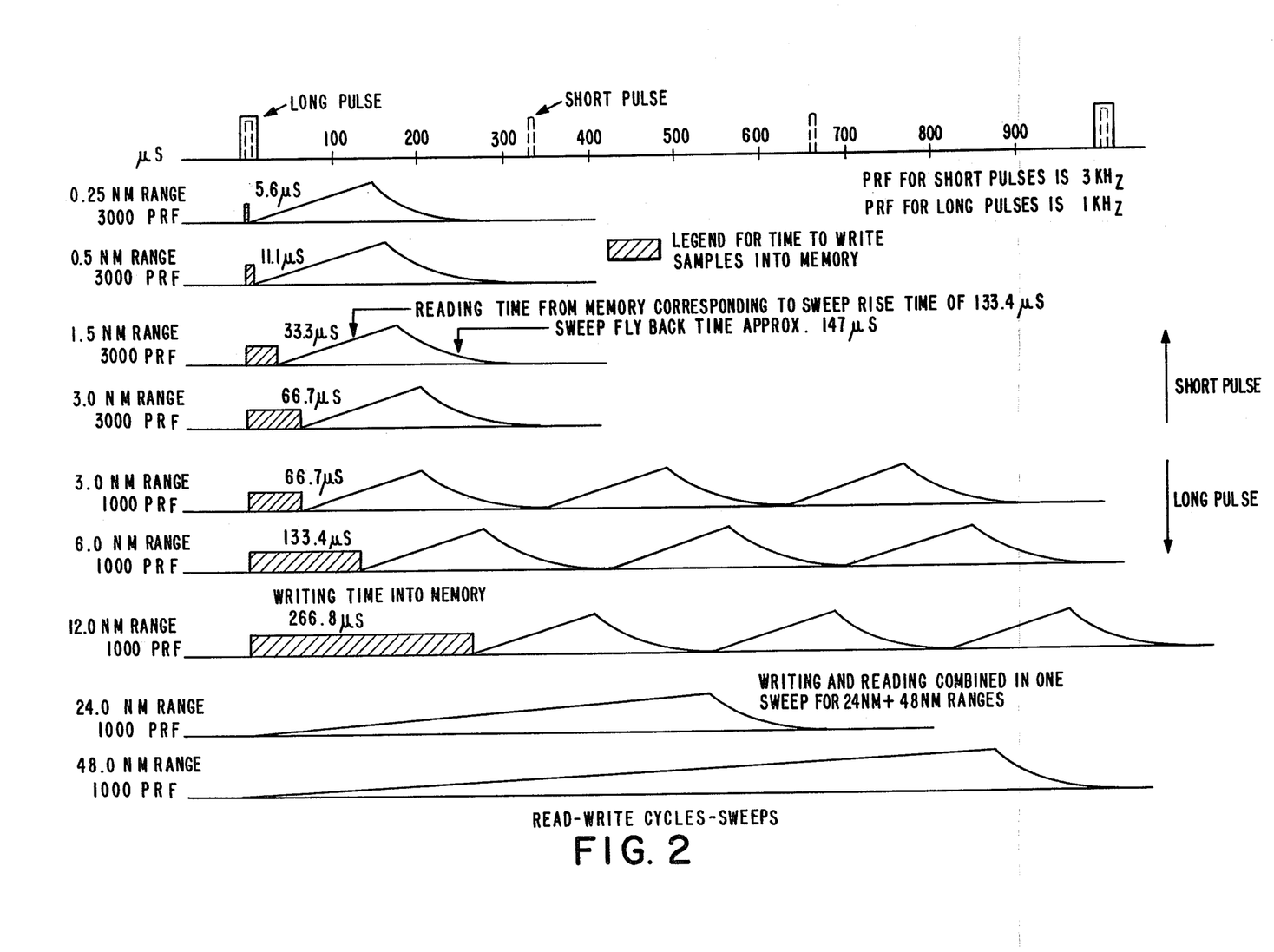
FIG. 2 shows wave forms relating to the operation of the radar indicator for different ranges or full scale settings.

Let us refer now to FIG. 2 wherein wave forms are shown relating to the operation of the circuits for the processing of the video signal in respect of the writing in the memory of the video data and the readout of the same with a different rate possibly repeated according to the radar ranges as it is clearly shown in this figure.

Figure 3:
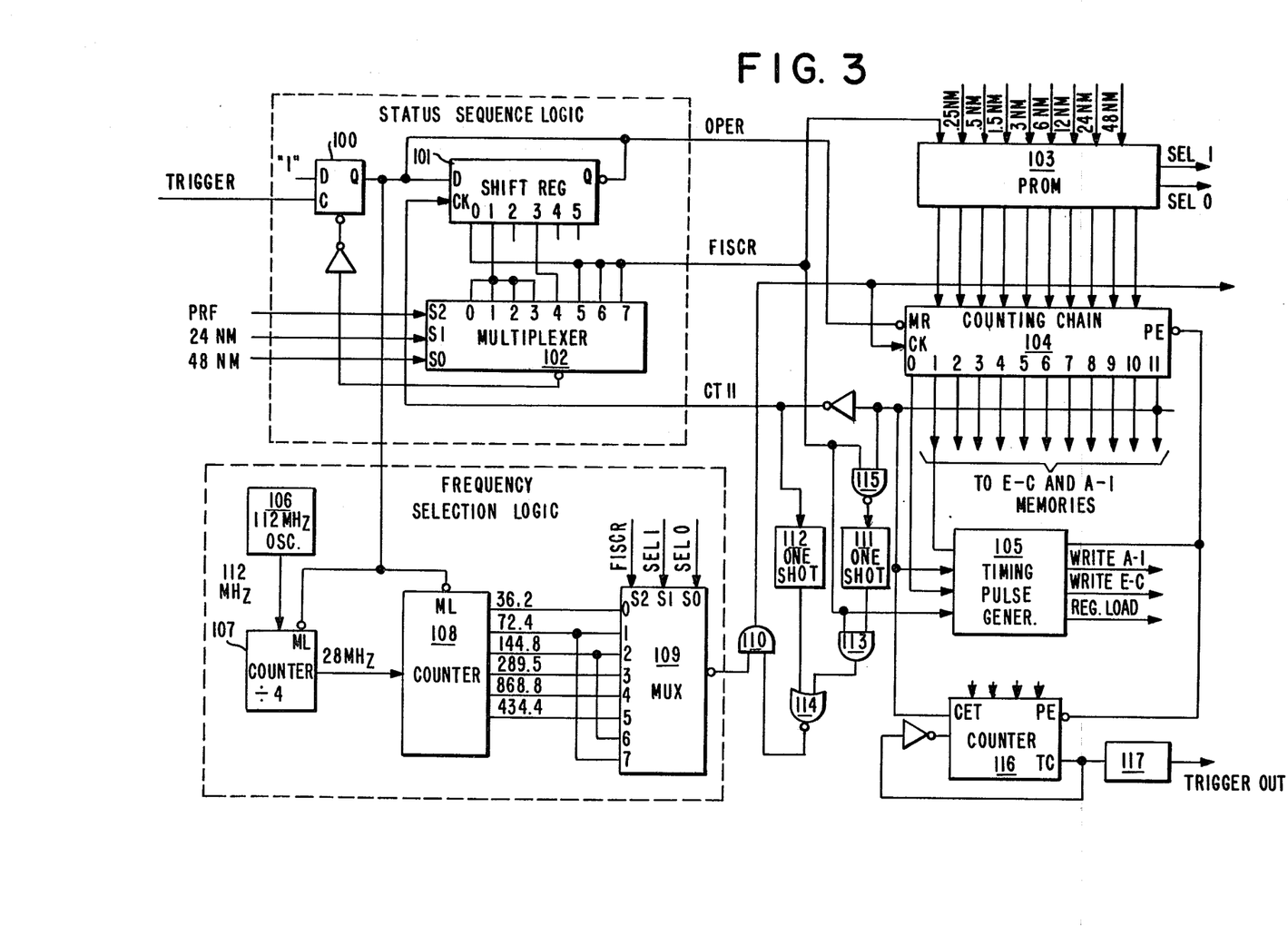
FIG. 3 shows the block diagram of control circuits.

Let us refer now to FIG. 3. The radar trigger actuates the bistable 100 making part of the logic for the status sequence, the output of which, OPER if active, indicates that it is being carried out a writing cycle and subsequent display. The bistable 100 will be then disabled at the end of the operation cycle by means of a signal produced by the logic of the status sequence.

The operation cycle entails a sequence of statuses the number and duration of which depend substantially upon the pulse repetition frequency which is being utilized.

In a possible embodiment utilizing two different pulse repetition frequences of 1 KHz and 3 KHz (associated to a duration of the transmitted pulse of 0,5 and 0,05 microseconds, respectively) the sequence of the phases which constitute the cycle may be preferably the following one:

3 KHz PRF (a) a phase for the writing into the memory having a duration corresponding to 1,8 times the selected full scale and followed by a phase of readout and display corresponding to 1,8 times the full scale corresponding to 6 nautic miles;

(b) for a pulse repetition frequency of 1 KHz and a full scale up to 12 nautic miles, a writing phase corresponding to 1,8 times the selected full scale, followed by 3 phases of readout and display having a duration of 1,8 times the full scale of 6 nautic miles;

(c) for a pulse repetition frequency of 1 KHz and a full scale beyond 12 nautic miles, according to the conventional technique.

Sequences of statuses different from the ones now disclosed may be utilized for optimizing the performances of the system with different pulse repetition frequencies.

Referring again to FIG. 2, in this figure there is shown the timing diagram of the phases in the above disclosed case. For the ranges in which the writing into the memory and the display occur in subsequent times the writing phase has a variable duration whilst the readout phase has a constant duration. The ratio between the duration of these two phases is variable. As the number of the written samples is equal to the one of the displayed samples it will occur that the ratio between the frequencies of the samples in the reading and in the writing phases corresponds to the inverse of the ratio of the durations of the reading and writing phases.

The logic of the sequence of the statuses (FIG. 3) comprises preferably a shifter register 101 and a multiplexer 102. The shifter register 101 is clocked by a signal produced at the end of each phase by means of the sample counter 104.

The first bit of the register 101 is activated at the end of the writing. The second bit of the register 101 is activated at the end of the first re-reading. Similarly the subsequent bits are orderly activated at the end of the subsequent re-readings.

The multiplexer 102 selects, according to the information of the pulse repetition frequency and full scale which are utilized, the output of the register 101 which is used for giving the end-of-operation signal which disables the bistable 100.

In the example above described the selection is made as follows:
  the first bit of the register 101 for a full scale greater than 12 NM and a PRF of 1 KHz;
  the second bit for a PRF of 3 KHz;
  the fourth bit for a PRF of 1 KHz and a full scale up to 12 NM.

During the writing phase the input signal is sampled at a frequency depending upon the selected full scale and consequently the samples are written into the memory. During the reading phase the samples which have been written into the memory are read-out at a generally different frequency with respect to the writing frequency in order to realize an extension or compression of the time base.

The sampling frequencies for the writing and the frequencies for the readout are selected in such a way in order to obtain the following:
  to guarantee at least 1 or 2 samples for each pulse;
  to guarantee ratios between the reading and writing frequencies inversely proportional to the ratio of the duration of the reading and writing phases;
  to minimize the amount of required memory;
  to require reasonable times for memory access.

In the table 1 there are shown the sampling periods used in the writing and reading for different "full scales" used in the above quoted example.

There are also indicated the ratios between the duration of the writing and reading phase and the number of samples to be displayed.

Table 1 follows

TABLE 1

| Scale (NM) | Write period (n sec) | Readout period (n sec) | Expansion ratio | Number of samples |
|---|---|---|---|---|
| 0.25 | 36.2 | 868.8 | 24 | 155 |
| 0.5 | 36.2 | 434.4 | 12 | 307 |
| 1.5 | 36.2 | 144.8 | 4 | 920 |
| 3 | 36.2 | 72.4 | 2 | 1840 |
| 6 | 72.4 | 72.4 | 1 | 1840 |
| 12 | 144.8 | 72.4 | ½ | 1840 |
| 24 | 289.5 | 289.5 | 1 | 1840 |
| 48 | 285.5 | 289.5 | 1 | 2048 |

The sampling frequencies are produced by the frequency selection logic (FIG. 3) controlled by a local oscillator.

The local oscillator comprises a Quartz controlled oscillator 106 operating at the frequency of 112 MHz which feeds a counter 107 which divides by four the input frequencies providing an output frequency at 28 MHz. The counter is cleared by means of the bistable 100. Consequently, the output frequency is present only during the writing and display phases and is synchronized with respect to the trigger with a maximum displacement of ±4.5 n sec.

The 28 MHz output is sent to a counting chain 108 comprising a three stages divider which provides frequencies at ½; ¼; and ⅛ of the input frequency, of a divider by six which, starting from the frequency ½ produces the frequency 1/12 and a divider by two wherefrom the 1/24 frequency is obtained.

The eight input multiplexer 109 selects the frequency to be utilized in function of the signal FISCR produced by the logic of the status sequence, which distinguishes the reading phase from the writing phase and the signals SEL 1 and SEL0 produced by the PROM 103 according to the selected full scale.

The clock produced on the output of the multiplexer 108 before being distributed to all the circuits of the system to permit the synchronous operation of the whole device is made to pass through the gate 110 the function of which will be disclosed hereinafter. The clock is sent also to the counting chain 104. Such twelve bit counter 104 has a double function. In first place this counter 104 is used for producing the addresses of the random address memory wherein the received samples are stored. In second place the counter 104 is used for the determination according to the number of counted pulses and the sampling frequency of the duration of the active phase for the readout and writing.

Since the number of samples is not greater of 2048, organized in 512 groups each of which comprises 4 samples for the expansion logic, and in 1024 groups each of which comprises 2 samples for the anti-interference logic it is derived immediately that only 9 of the 12 bits are utilized for the addressing of the expansion memory and 10 are utilized for the addressing of the anti-interference memory.

The most significant bit of the counter 104, the bit CT11 has a value of "One" when a writing or reading operation is being carried out and goes to "zero" to the completion of the active portion of the phase; the bits "zero" and "one" are utilized in the timing logic for the production of the required wave forms and for the correct writing in the expansion—compression memory.

In the rest conditions, the counter 104 is kept with all its bits to "zero". During the operation the counter is made to advance by the selected clock. When the bits CT0 and CT1 of the counter are both at level "one" and the bit CT11 is at level "zero" the timing logic 105 produces a loading signal for the counter 104 to the value stored in the PROM 103 and selected according to the full scale.

The pattern loaded into the counter has always the bit "11" equal to "one" and the bits "zero" and "one" equal to "zero". Consequently, this is a pattern comprised between 2048 and 4096. The number of samples which will be written and subsequently read out during the operation is given by the difference between 4096 and the initial pattern.

Once loaded the initial pattern, the counter 104 counts the clock pulses producing on the output the writing and/or reading addresses of the memory up to when the counter 104 reached the final pattern overflows in the pattern "zero".

The going to "zero" of CT11 marks the end of the active phase of writing and display and causes the updating of the status of the logic of the sequence of statuses.

In order to allow the return of the trace of the indicator it is necessary to introduce a pause corresponding to the return time between two subsequent displays, by increasing the time in which the bit CT11 of the counter 104 is at "zero".

Such result is obtained by actuating the one-shot 111 at the end of every reading and display active phase.

A pause of less than one microsecond is also required, for each switching of the logic of the sequence of the statuses, for illuminating the effects of the transients due to the switching of the multiplexer 109 and of the PROM 103. Such second pause is obtained with the one-shot 112 actuated for every transition of CT11 to "zero".

The output of the two one-shot 111 and 112 are applied on the gate 110 after a combination by means of the gates 113 and 114, and these outputs halt, if active the sending of the clock to the system.

The one-shot 111 causes the halting of the clock only when the signal FISCR at the level "one" indicates that one is in the phase of display. This is necessary for permitting the writing in the memory for the expansion and compression of the samples of a new sweep, even if there is present the return of the trace of the last display of the previous sweep. Moreover, the one-shot 111 through the gate 115, is actuated only at the end of the display phases.

The bit CT11 of the counter 104 is utilized also for producing the display trigger. For this purpose, the passage to "one" of CT11 during the display phase (FISCR at the level "one") or if the ranges of 24 or 48 NM have been selected enables the counter 116 to count starting from an initial pattern loaded into the counter 116 contemporaneously to the loading of the counting chain 105.

The counter 116, after having counted the predetermined number of samples, stops in the position of end of counting and actuates the one-shot 117 producing the trigger for the display. The delay interposed by the counter 116 between the transition to "one" of CT11 and the production of the display trigger has the purpose of compensating the delays introduced in the chain of digital processing.

Figure 4:
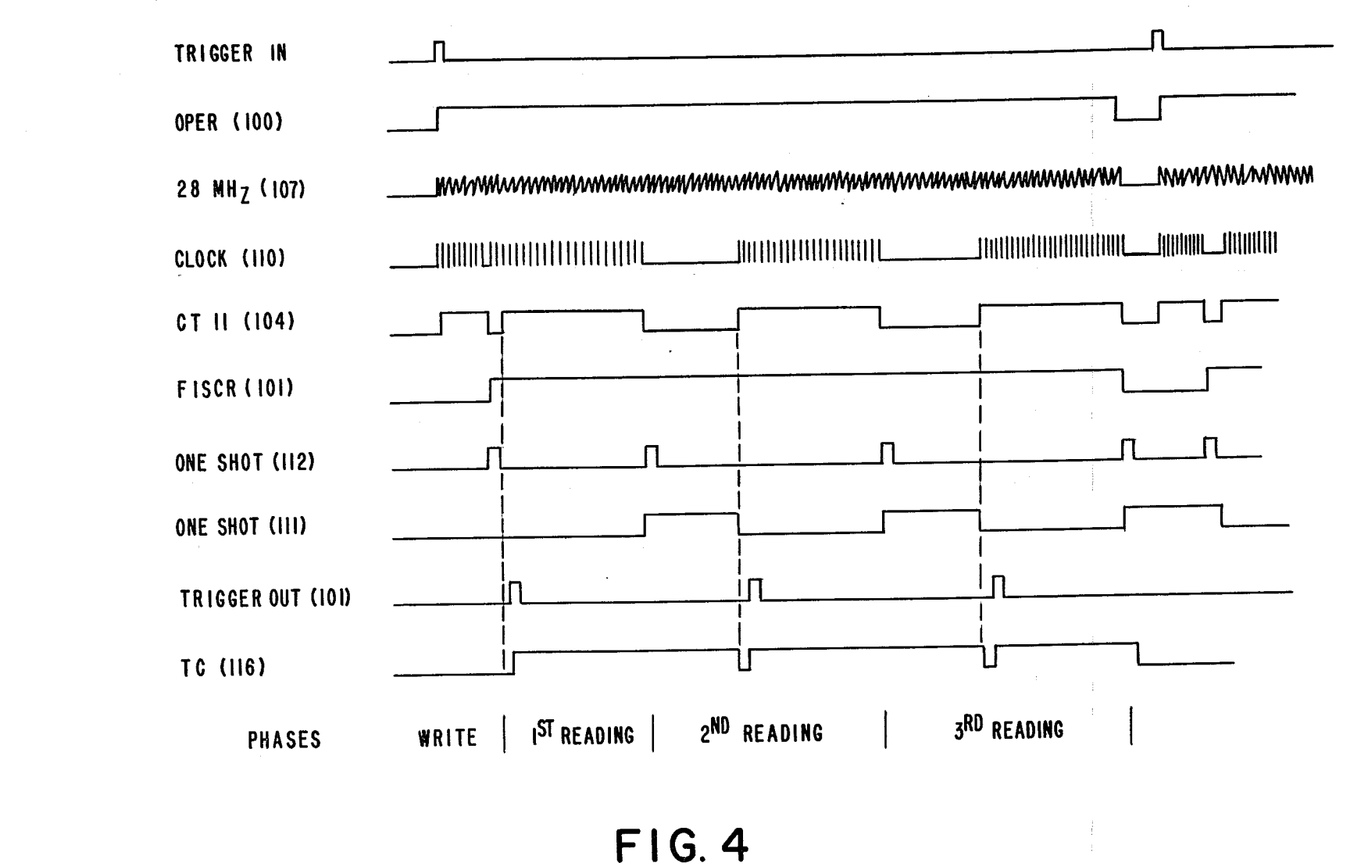
FIG. 4 shows timing wave forms.
Figure 5:
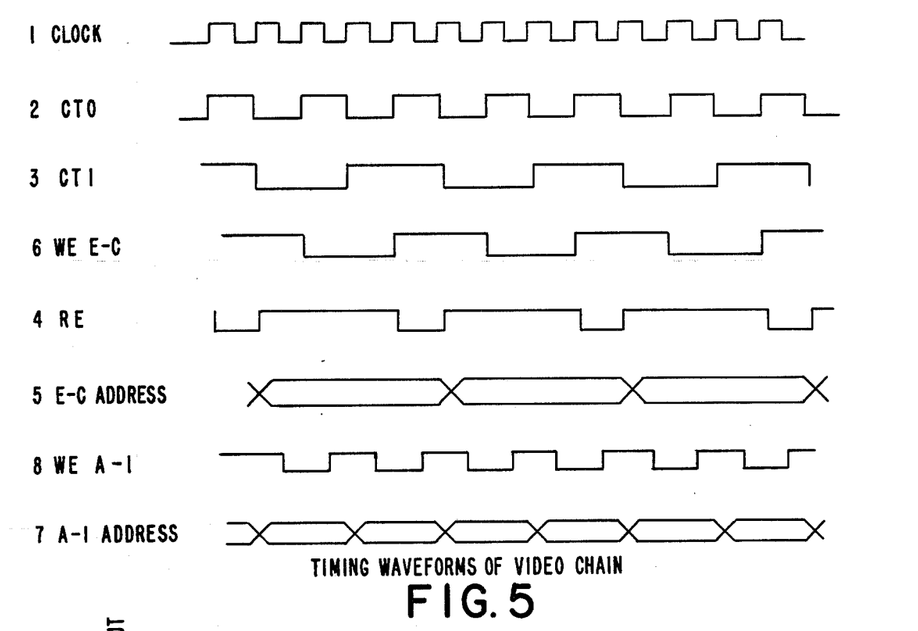
FIG. 5 shows further wave forms for the timing of the video chain.

If the number of delay samples introduced in the counter 116 is changed with the change of the full scale, it becomes also possible to compensate the delay differences introduced in the RF, IF and video paths, between video and trigger. In this case the applied delay, measured in samples, depends upon the sampling frequency utilized during the writing phase; such frequency, as shown in table 1 being depending upon the full scale. The general operation of the timing and control section is shown by the wave forms of FIG. 4. In FIG. 5 there are shown instead the timing signals produced by the logic 105 and distributed to the video processing chain.

The timing wave forms of the FIG. 5 are produced starting from the least significant bits of the address counter. In the writing and reading of the expansion and compression memory, the samples are organized in groups of four. The signal shown on the line 4 is utilized for enabling the loading of data in the series/parallel and parallel/series converters; the data and the addresses switch in accordance with the wave form number 5. The writing pulse in the expansion and compression memory is timed as shown in line 6. The writing and reading of the anti-interference memory are performed in groups of two samples. The least significant bit of the address of the anti-interference memory is the bit CT1; addresses and data switch as shown in line 7. The writing pulse is timed as shown in line 8.

Figure 6A:
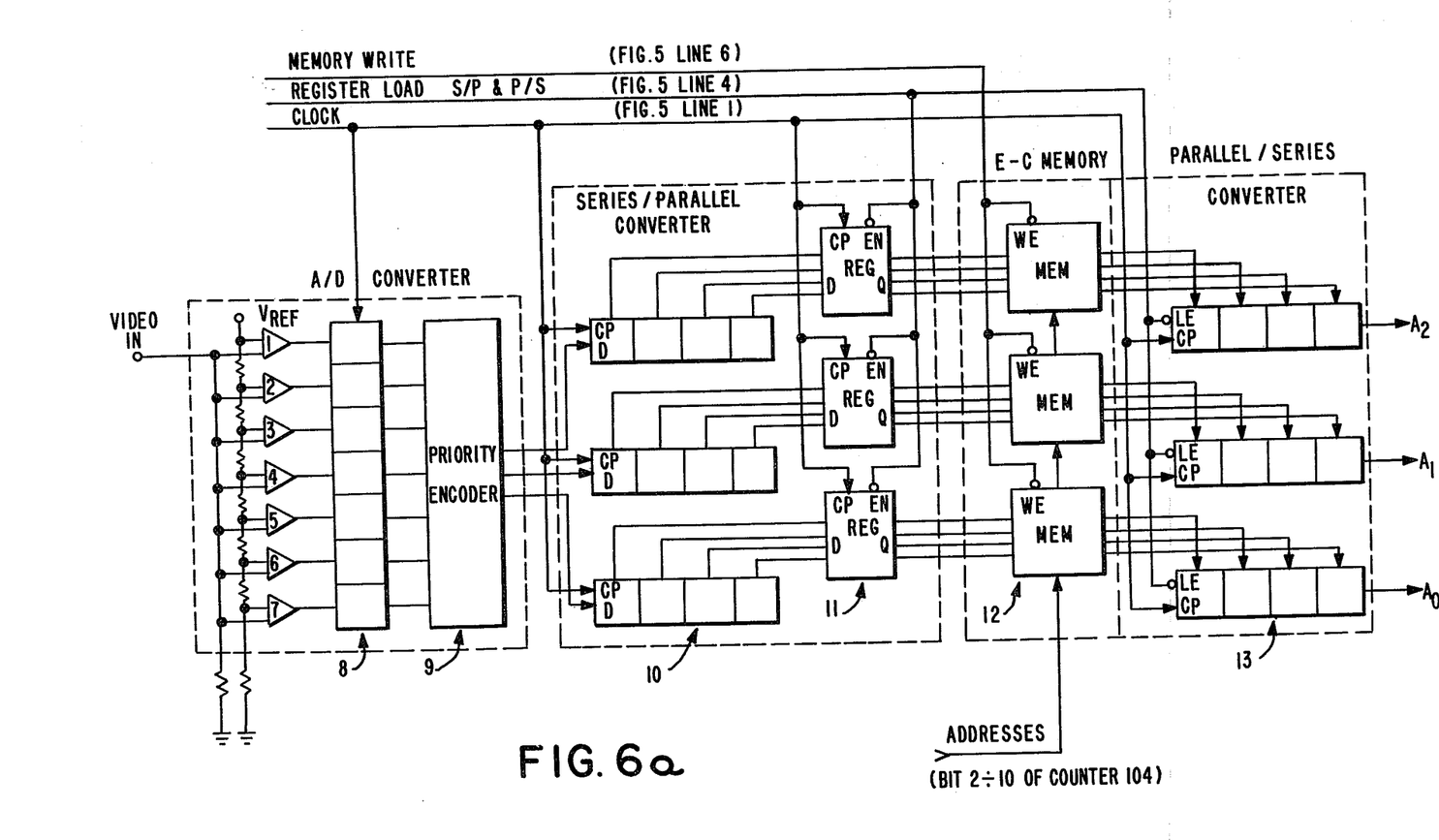
FIG. 6a shows circuits for the memorization of wave forms of the video signal.

The signals produced by the timing and control section are utilized for timing all the operative phases of the video chain described hereinafter with reference to FIGS. 6a, 6b and 8.

With reference to these figures, the input video signal is sent to a bank of parallel connected comparators which constitute the analog-digital converter. The video signal is applied on the input "a" of each comparator. To the inputs "b" of the comparator there are applied voltages Vi derived in a voltage divider comprising a chain of series connected resistors.

The voltages Vi have increasing values with the increase of the order of the comparator to which they are applied. The increase law is a linear one if the resistors have the same values and is non-linear if the values of the resistor are not the same.

In order to avoid possible undesired oscillations in correspondence with the switching point of the comparators, each comparator is provided in a known way with an hysteresis network.

The outputs of the seven comparators are digitized in the seven registers shown in 8 with a sampling frequency FC depending upon the selected range. The timing signal used for the sampling is the same for all the registers of the unit. The outputs of the seven registers shown in 8 are sent to the priority encoder 9 and codified by this one on three bits. The code "0" is assigned to the video signals having a level lower than the lowest threshold level whilst the code "7" is assigned to the signal which goes beyond the maximum value.

The three outputs of the converter are sent to a memory which may contain all the samples produced in a repetition period of the selected range, the number of which is shown in column 5 of table 1.

As the memories available on the market have writing and reading times appreciably greater than the minimum sampling period of 36 nanoseconds it is necessary to memorize n samples in parallel at a frequency corresponding to one n-th of the sampling frequency. For this reason the three bits on the output of the encoder 9 are firstly sent to three series/parallel converters constituted by the shift register 10.

Every four samples the three words comprising four bits contained in the register 10 and constituted each by the four subsequent samples relating to the bit having the considered weight, are transferred into the registers 11. The twelve bits on the output of the registers 11 remain stable for a time corresponding to four sampling periods. The loading of the registers is performed with the wave form indicated in 4 in FIG. 5.

In view of the fact that the sampling period, which changes with the selected full scale, has a value at minimum of 36 nanoseconds, the writing cycle has a minimum duration of 144 nanoseconds and is obtainable with the memories currently available on the market.

The twelve bits on the output of the registers 11 are written into the RAM memories 12. The writing wave forms are shown in FIG. 5 (line 6).

The writing and reading addresses of the memories 12 are provided by the counter 104 of FIG. 3 (bits from 2 to 10) and switch every four clock pulses (FIG. 5, line 5).

The capacity of the memory of 2048 samples of three bits permits the storage of a portion of signal corresponding to 1,8 times the selected full scale using the sampling frequencies depending upon the duration of the transmitted pulse as it is shown in table 1. On the output of the memory a parallel/series converter constituted by the shift register 13 is utilized for the reconstruction of the initial sequence of the samples. The registers 13 are loaded in parallel, a sampling period out of four, according to the time shown in FIG. 5, line 4, with the data present on the output of the memories 12 in the three sampling periods subsequent to the one of loading of the register in which the first of a group of four samples appears on the output. Also the three remaining samples of the group appear on the output the one following the others.

It should be remarked that the circuital solution which has been adopted allows for writing cycles having a duration greater than 288 nanoseconds (sampling period of 72 nanoseconds) of rendering the memory transparent to the input signal during the writing phase; in other words, the signal written into the memory may be read out on the output in the same cycle, allowing in this way to effect, if required, the direct display of the input video without the need of a preliminary storage.

Figure 6B:
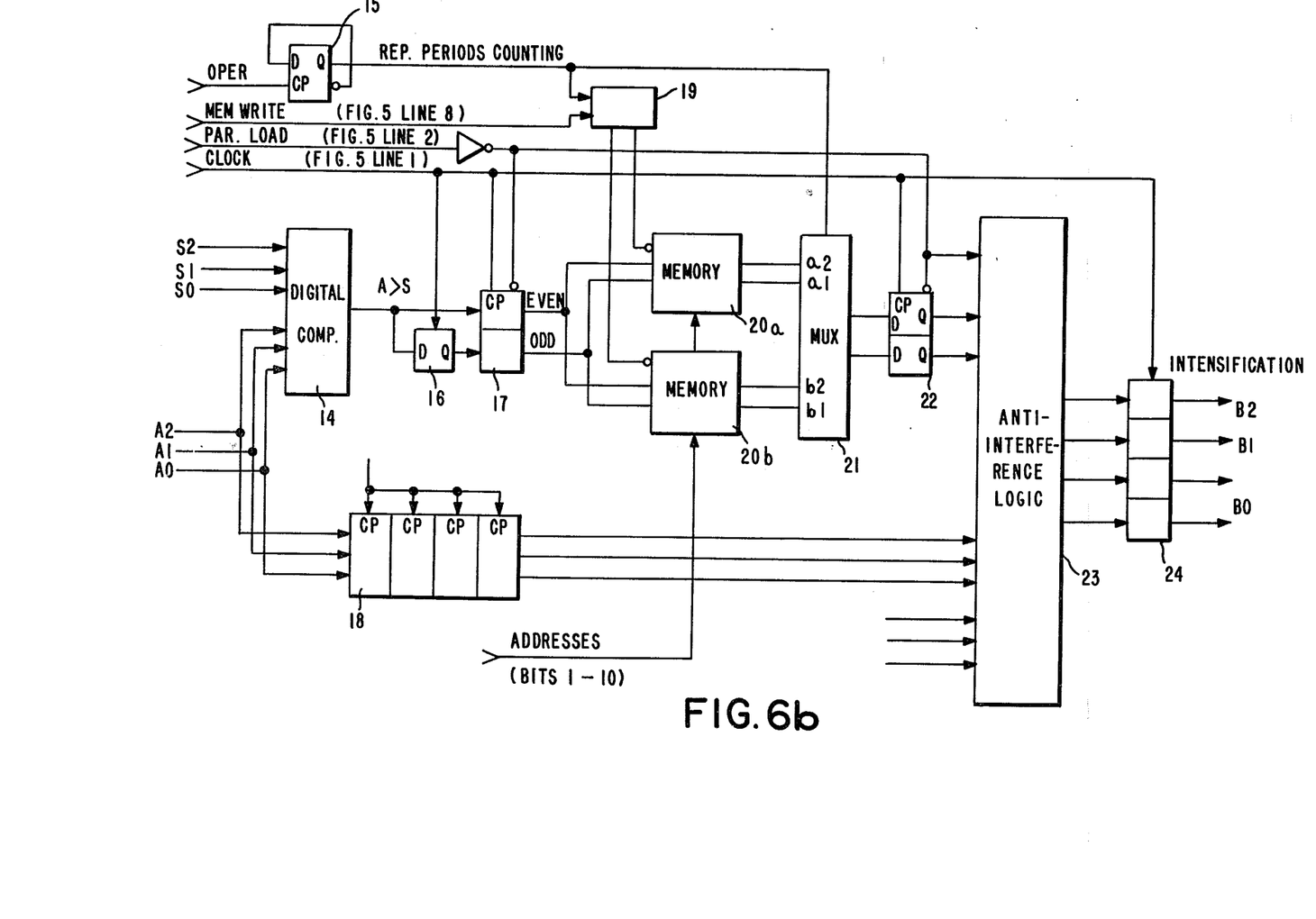
FIG. 6b shows the anti-interference processing circuits.

The samples produced on the output of the expansion and compression section are subjected to the anti-interference processing with the circuit shown in FIG. 6b. Such processing consists in bringing to the output the signals higher than the noise level only if also in the previous repetition period there had occurred the presence of a signal greater than the noise level. In this way the strong and uncorrelated signals due to interference by other radars are cancelled.

The three bits A2–A0 on the output from the converters 13 which perform a conversion parallel/series of the memory contents are sent to the anti-interference logic 23 through two different parts.

On the first part there arrive to the logic 23, through the registers 18 the samples relating to the current repetition period, represented with three bits. The registers 18 which produce a delay of four clock shots have the function of alligning in time the samples of the first way with those which go through the second way.

On the second way, there arrive to the logic 23, through the memories 20, the informations relating to the value of the samples which were produced in the previous repetition period. Owing to the way of operating of the anti-interference logic it is not necessary to memorize all the three bits of the sample of the previous repetition period but it is sufficient to memorize, with a single bit, whether or not the sample had been or not higher than a predetermined threshold: this allows an appreciable saving in the capacity of the memory.

For this purpose the second way is constituted by the digital comparator 14 which compares the input samples A2–A0 with a predetermined threshold S2–S0.

The output of the comparator 14 is memorized in the memories 20a and 20b.

Since the minimum sampling period during the reading is of 72 nanoseconds, in order to allow longer access and writing times, the memorization is performed in pairs of samples, with a minimum cycle of 144 nanoseconds. For this purpose the registers 16 and 17 constitute a series:parallel converter, the output of which switches every two clock pulses according to what is shown on line 7 of FIG. 5. The register 17 is enabled to load by means of the bit "zero" of the counter 104, previously inverted.

The 1024 pairs of bit which overcome the threshold relating to a given repetition period are written into the memory 20 according to the writing wave form shown in line 8 in FIG. 5.

The memory 20 is organized in the two sections 20a and 20b. One of the two sections is utilized for writing the information relating to the current repetition period; the other one for reading the information relating to the previous repetition period. The two sections exchange their function for each repetition period.

The switching is controlled by bistable 15 which counts by two the repetition periods. The output of the counter 15 is utilized for routing the writing pulses to the one or the other of the two memories by means of the switch 19 and for selecting the output of the memories by means of the selector 21. The outputs of the selector 21 are loaded into the register 22 every two clock pulses. From this register these signals are sent to the anti-interference logic 23 which will perform also the function of a parallel/series converter by selecting according to the value of the bit "zero" of the counter 104 one of the bits of the pair. In this way the three inputs mentioned operate as a single input which specifies for each current repetition period whether the corresponding sample of the previous repetititon period had been higher or not than the threshold value S. The logic 23 performs three different combinatory functions and it is preferably embodied by means of a PROM.

The first function is the one of parallel/series converter above mentioned. Said D0, D1 and CTO the three inputs, there is produced an internal variable E according to the following logic relationship:

$E = D0 \overline{CT0} + D1 CT0$

The variable E represents the samples of the previous repetition period having an amplitude A such as that it is A S, being S the threshold value.

The second function is the one of the anti-interference ligic:

such logic has as inputs the three bits which represent the amplitude A of the sample in the current repetition period and the variable E internal which indicates the overcoming of the threshold which occurred in the previous repetition period. The output of said logic is constituted by the internal variable F represented with three bits.

The relationship between A, E and F is shown in the following table II:

TABLE II

|   |   | 0     | 1     | E |
|---|---|-------|-------|---|
| A | S | F = 0 | F = A |   |
| A | S | F = A | F = A |   |

The third function realized by the logic 23 consists in modifying the transfer curve relating to the input-output relationship in order to adapt it to the environmental conditions.

Such a function has as inputs the internal variable F having three bits and three bits used for selecting the selected transfer curve.

The outputs of said functional block are the three bits of B0–B2 which represent the output sample B and a fourth bit TS used for producing a stretched pulse in correspondence with strong signals appearing on long ranges.

Figure 7:
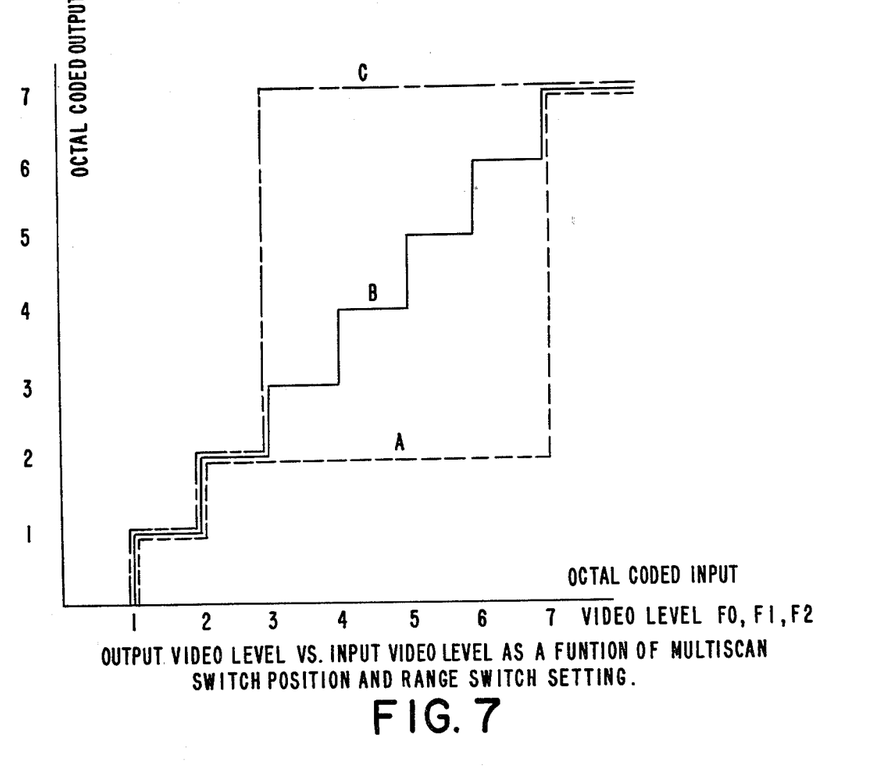
FIG. 7 shows the behavior of a transfer function which may be selected for the optimization of the display.

In FIG. 7 there is shown an example of the input-output relationship which may be obtained with the functional block now disclosed. The curve C tends to amplify all the signals which are greater than the level "2" whilst the curve A tends to attenuate all the signals lower than the level "7". The output TS is actuated every time that the output B reaches the level "7".

The outputs of the logic 23 are staticized in the register 24 and therefrom sent to the output section.

Figure 8:
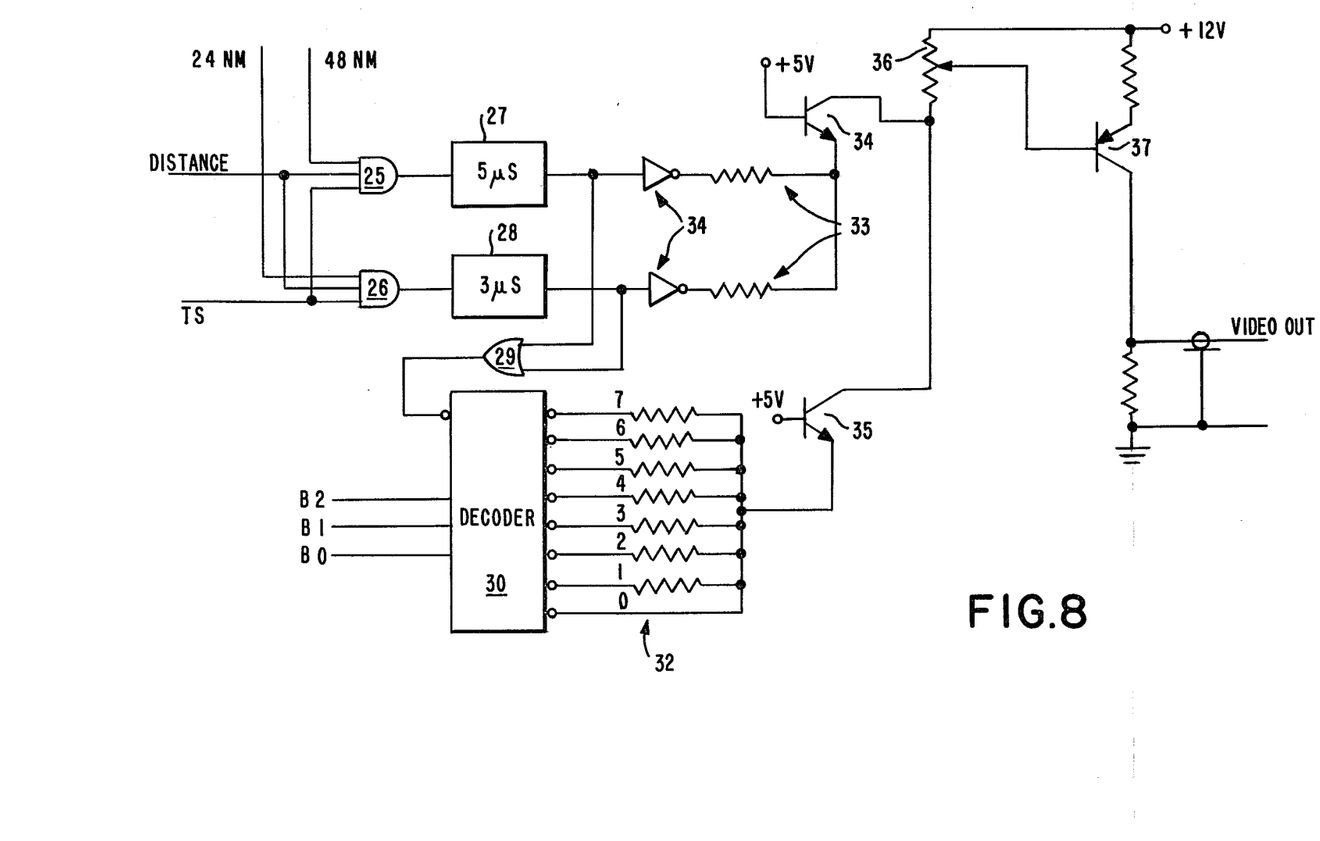
FIG. 8 shows the circuits for converting back in analog form the video signal and for the intensification of the returns on the long ranges.

A preferred embodiment of the output section is shown in FIG. 8. The three bits which represent the output signal are sent to the decoder 30 utilized for generating currents proportional to the input numeric value and to realize in this way a digital to analog converter operating on seven levels. The use of the decoder allows to realize non linear transfer functions, by changing the ratios between the resistors 32. The intensification bit TS is utilized for actuating the one-shot 27 and 28 having a holding time different according to the selected range. The actuation is enabled by the range selection signals and for distances greater than a predetermined distance by means of the logic units 25 and 26.

The actuation of one of the two one-shot 27 or 28 causes the disabling of the decoder 30 through the logic adder 29 and the injection of current in the transistor 34 by means of the inverter 31 and the resistors 33.

The currents produced by the transistors 34 and 35 (which exclude each other) are summed on the potentiometer 36 which performs a level control. The signal having a variable level is amplified and transferred to the output by the transistor 37.

What is claimed is:

1. A radar indicator comprising input means for receiving video radar signals, analog-to-digital converter means connected to said input means for converting received video radar signals to digital signals representative thereof; memory means for storing the digital signals from said converter means; output means adapted for connection to a radar display device; and control means, including radar range selection means and display brightness selection means, for controlling the transfer of signals from said converter means into said memory means and the transfer of signals out of said memory means to said output means to cause signals to be transferred into said memory means at a speed dependent upon the radar range selected by said range selection means and to be transferred out of said memory means at a speed dependent upon the display brightness selected by said brightness selection means; said control means further including means for causing transfer of signals out of said memory means a plurality of times between consecutive transfers of signals into said memory means for at least some of the radar ranges selected by said radar range selection means to provide for those radar ranges a multiple display on a radar display device connected to said output means.

2. A radar indicator as claimed in claim 1 further comprising interference suppression means coupling said memory means to said output means for suppressing signals transferred out of said memory means when those signals include uncorrelated signals in excess of a first predetermined threshold level.

3. A radar indicator as claimed in claim 1 or 2 further comprising means for intensifying and stretching signals transferred out of said memory means when the radar range selected by said radar range selection means exceeds a second predetermined value and the magnitude of the output signals exceeds a third predetermined value.

4. Indicator according to claim 3 comprising means for modifying the transfer function between input and output, at digital level, preferably under the control of a PROM memory.

5. A radar indicator comprising radar range selection means for selecting a range of radar signals to be indicated; input means for receiving video radar signals; analog-to-digital converter means connected to said input means for converting received video radar signals into multiple-bit digital signals representative thereof; first signal formatting means for forming digital signals from said analog-to-digital converter means into a plurality of bytes each having a preselected number of bits; addressing means for indicating a memory address; memory means for storing the plurality of bytes at memory locations indicated by respective memory addresses from said addressing means; second signal formatting means for forming bytes transferred thereto from said memory means into multiple-bit digital signals; first control means for suppressing multiple-bit digital signals which include uncorrelated signals in excess of a first predetermined threshold level; second control means for intensifying and stretching signals from said first control means when the radar range selected by said radar range selection means exceeds a second predetermined value and the magnitude of those signals exceeds a third predetermined value; digital-to-analog converter means for converting digital signals from said first and second control means into video signals; output means adapted for connection to a radar display indicating device for applying thereto video signals from said digital-to-analog converter means; and third control means for causing transfer of bytes from said memory means to said second signal formatting means a plurality of times between consecutive receipts of video radar signals by said input means for at least some of the radar ranges selected by said radar range selection means to provide for those radar ranges a multiple display on a radar display indicating device connected to said output means.

6. A radar indicator as claimed in claim 5 including means for clearing said memory means and causing said analog-to-digital converter means and said first signal formatting means to store new bytes therein.

* * * * *